United States Patent
Valentine et al.

(10) Patent No.: US 6,600,740 B1
(45) Date of Patent: *Jul. 29, 2003

(54) VOICE QUALITY OPTIMIZATION ON MULTI-CODEC CALLS

(75) Inventors: Eric Valentine, Plano, TX (US); Walter Lee Davidson, McKinney, TX (US)

(73) Assignee: Ericsson Inc, Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,663

(22) Filed: Oct. 3, 1998

(51) Int. Cl.[7] ................................................ H04L 12/50

(52) U.S. Cl. .................... 370/365; 370/255; 370/465

(58) Field of Search ............................... 370/252, 321, 370/318, 337, 347, 465, 464, 304, 305, 324, 332, 352–357, 360, 365, 514, 366, 367, 369, 389, 395.5, 401, 466; 348/14.09, 14.02, 14.13

(56) References Cited

U.S. PATENT DOCUMENTS

| | | | | |
|---|---|---|---|---|
| 4,910,510 A | * | 3/1990 | Davis et al. | 340/7.41 |
| 5,101,406 A | * | 3/1992 | Messenger | 370/349 |
| 5,481,574 A | * | 1/1996 | Evert et al. | 375/356 |
| 5,774,457 A | * | 6/1998 | Iizawa | 348/14.09 |
| 5,838,664 A | * | 11/1998 | Polomski | 370/263 |
| 5,970,233 A | * | 10/1999 | Liu et al. | 709/246 |
| 5,982,766 A | * | 11/1999 | Nystrom et al. | 370/347 |
| 6,081,552 A | * | 6/2000 | Stevenson et al. | 375/240 |
| 6,111,879 A | * | 8/2000 | Choi | 370/395.61 |
| 6,128,317 A | * | 10/2000 | Mackre | 370/479 |
| 6,175,856 B1 | * | 1/2001 | Riddle | 709/204 |
| 6,181,693 B1 | * | 1/2001 | Maresca | 370/352 |
| 6,195,337 B1 | * | 2/2001 | Nystrom et al. | 370/252 |
| 6,324,174 B2 | * | 11/2001 | Bharucha et al. | 370/230 |

* cited by examiner

*Primary Examiner*—David Vincent
*Assistant Examiner*—Brian Nguyen

(57) ABSTRACT

A communication network having multiple codecs communicating voice calls between an originating network and a terminating network. The communication network includes an originating codec and a terminating codec. The network provides signaling indicating the decoding algorithm to the originating network, and indicating the encoding algorithm to the terminating network. The original encoding algorithms and the original decoding algorithms are then altered from the standard as a function of this signaling to produce a best fit encoding matching to improve voice quality.

20 Claims, 1 Drawing Sheet

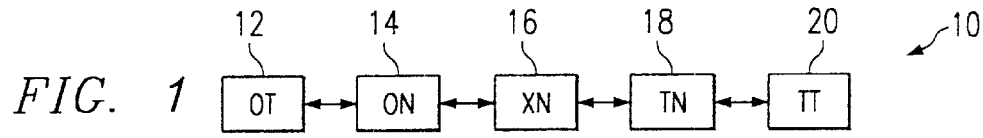
FIG. 1
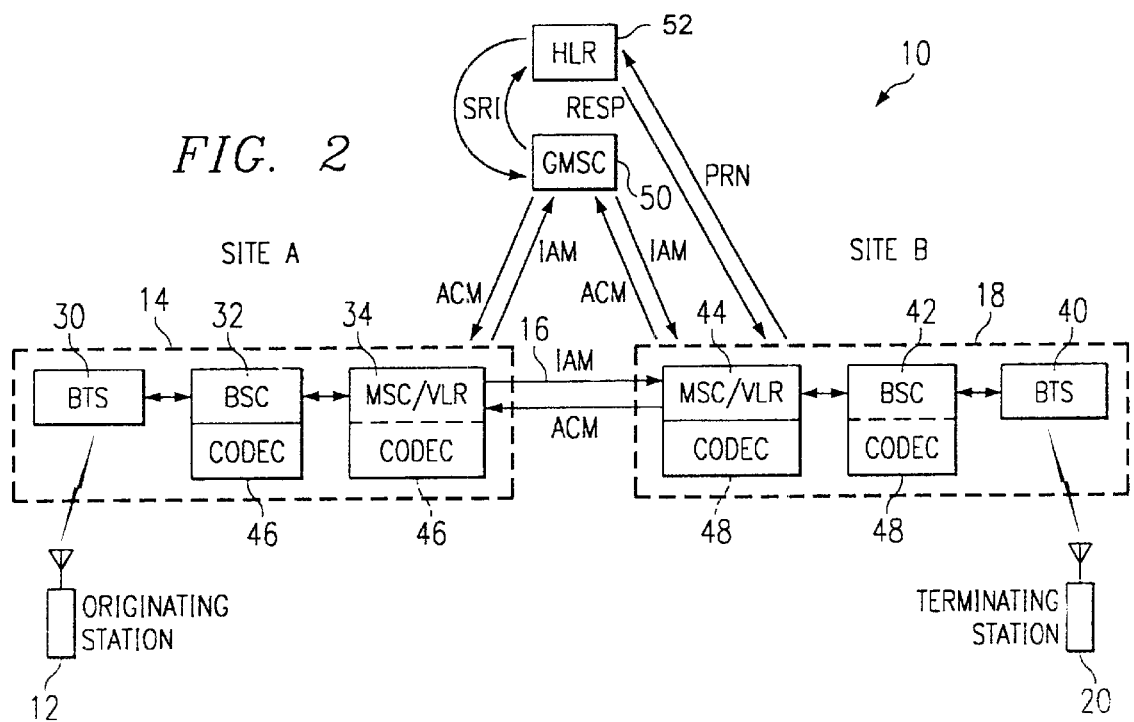
FIG. 2
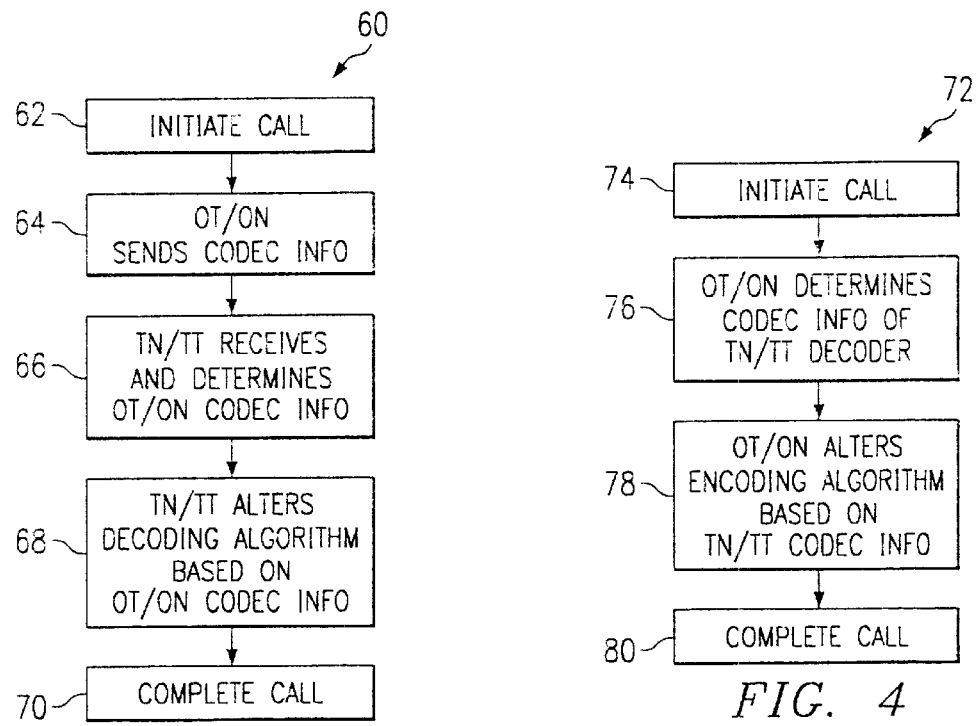
FIG. 3
FIG. 4

VOICE QUALITY OPTIMIZATION ON MULTI-CODEC CALLS

FIELD OF THE INVENTION

The present invention is generally related to communication networks including wireless telephony communication networks, communicating voice calls between an originating network and a terminating network, and more particularly to a communication network having dissimilar compression and decompression equipment, such as codecs, in the speech path.

BACKGROUND OF THE INVENTION

Communications networks, including wireless communication networks, typically include an originating network, a terminating network, and a communication link exchanging voice and data between these networks. In the case of telephony networks, analog speech signals are typically digitized through digital sampling prior to transmission over the communication link and then converted back to analog at the terminating network. To increase the capacity of the communication network, these digitized voice calls routed over the communication link are typically compressed through the use of compression and decompression equipment, commonly referred to as a codec or as a vocoder. Typically, a codec resides at both the originating end and at the terminating end of a call, whereby the digitized voice is compressed by an encoding algorithm in a forward direction, and decompressed by a decoding algorithm at the receiving end. The decompressed voice signal is ultimately converted back to voice through the use of a digital to analog (D/A) converter. The compressed digitized voice signals are typically routed over a communication link, such as a public switched telephone network (PSTN) in a pulse code modulated (PCM) format, typically at 64 kbps.

The repeated use of compression and decompression equipment (codecs) in a speech path yields poor speech quality. In particular, the use of different voice codecs in different networks exacerbates the problem. As, the speech compression becomes more widespread in communication networks e.g., through the expanding use of cellular networks and "voice over the Internet," this voice degradation problem becomes more troublesome.

Current codecs are based on conversion from the 64 kbps PCM encoding used in the PSTN and back again, and do not consider the previous or subsequent use of other codecs in the network handling a voice call. However, in many instances, information about the originating network, and the codec used at the originating network, is available at the transit network and at the terminating end. In addition, information about the terminating network, and the terminating network codec, is available to the originating end.

There is desired an improved communication network and method of transmitting voice calls across the network having multiple codecs which improves the quality of voice calls over the communication network.

SUMMARY OF THE INVENTION

The present invention achieves technical advantages as a communication network having multiple codecs whereby the originating network and the terminating network provide information of the resident codec to each other, and codec encoding and decoding algorithms are responsively altered to improve voice quality. In one embodiment, the originating network provides codec information indicating the encoding algorithm to the terminating network, and the terminating network alters the codec decoding algorithm to better match the encoding algorithm and improve voice quality. In a second embodiment of the invention, the terminating network provides information about the decoding algorithm to the originating network, whereby the originating network alters the codec encoding algorithm to better match the decoding algorithm and improve voice quality. In both embodiments, information about one network codec algorithm is provided to the other network to allow one network to adjust and match its codec algorithm to the other to improve voice quality.

The first embodiment of the present invention comprises a communication system comprising an originating network. The originating network comprises a transmitter generating an electrical signal representative of speech. The originating network further comprises an originating voice codec coupled to the transmitter encoding the electrical signal according to an encoding algorithm. A signal device is coupled to the transmitter and generates a codec signal link indicative of the encoding algorithm utilized by the originating voice codec.

The communication system further comprises a communication link coupled to the originating network, and a terminating network comprising a receiver and a terminating voice codec coupled between the communication link and the receiver decoding the received encoded electrical signal. The terminating voice codec has a decoding algorithm. The terminating network further comprises a processing device coupled to the communications link identifying the encoding algorithm as a function of the received codec signal, and responsively alters the decoding algorithm as a function of the codec signal. The terminating voice codec has a decoding algorithm. The terminating network further comprises a processing device coupled to the communications link identifying the encoding algorithm as function of the received codec signal, and responsively alters the decoding algorithm as a function of the codec signal. The terminating voice codec recreates the original encoded electrical signal as a function of the identified encoding algorithm. The processing device analyzes the encoded electrical signal as a function of the identified encoding algorithm. The processing device examines the digital speech stream and looks for encoding artifacts including values present that are useful in the enhanced decoding process to identify encoding parameters to recreate the original encoded electrical signal. The signal device sends a start/sync flag to the terminating voice codec to indicate the start of an encoding period, which is typically 20 milliseconds in GSM networks. Preferably, the originating voice codec encodes the electrical signal in PCM format such as 64 Kbps PCM. The communication link preferably comprises a public switched telephone network (PSTN).

According to the second embodiment to the present invention, a communication system communicates an encoded electrical signal representative of speech and comprises a terminating network. The terminating network comprises a receiver, and a terminating voice codec coupled to the receiver. The terminating voice codec decodes the encoded electrical signal according to a decoding algorithm. The terminating network further includes a signaling device coupled to the terminating voice codec and generates a codec signal indicative of the decoding algorithm. The communication system further comprises a communications link and an originating network including a transmitter generating the electrical signal. An originating voice codec is coupled between the transmitter and the communications link and generates the encoded electrical signal according to an encoding algorithm. The originating network further includes a processing device coupled to the communications link and identifies the decoding algorithm as a function of the codec signal, and responsively alters the encoding algorithm as a function of the codec signal. The processing device may send a start/sync flag to the terminating voice codec to indicate the start of an encoding period. The communication link preferably comprises a PSTN.

According to a method of a third embodiment of the present invention, the method comprises communicating an encoded signal representative of speech across a communication link between an originating network including an encoder having an encoder algorithm, and a terminating network including a decoder having a decoder algorithm. The method comprises the steps of the originating network sending a codec signal to the terminating network indicative of the encoding algorithm. The terminating network receives the codec signal and identifies the encoding algorithm of the function of the received codec signal. The terminating network then modifies the decoding algorithm as a function of the identified encoding algorithm. The codec signal may further include a start/sync flag, wherein the start/sync flag is utilized by the terminating network to ascertain the start of an encoding period. The decoding algorithm recreates the original encoded electrical signal as a function of the identified encoding algorithm. The terminating network analyzes and examines the encoded signal as a function of the identified encoding algorithm to find encoding artifacts that are useful to determine encoding parameters to recreate the original encoded signal.

According to a method of a fourth embodiment of the present invention, the method comprises the step of the terminating network generating a codec signal indicative of the decoder decoding algorithm. The originating network receives the codec signal and identifies the decoder algorithm as a function of the received codec signal. The originating network modifies the encoder encoding algorithm as a function of the identified decoding algorithm. In both methods, the communication link comprises a PSTN, but could also comprise an optical network or other link if desired.

BRIEF DESCRIPTION OF THE DRAWINGS

FIG. 1 is a block diagram of a communication network according to the present invention which may include a wireless communication network;

FIG. 2 is a block diagram of one preferred embodiment of the present invention whereby codec information at the originating network and codec information at the terminating network is communicated to the other network and encoding and decoding algorithms are responsively altered to improve voice quality therebetween;

FIG. 3 is a block diagram of the first method of the present invention whereby the originating network sends resident codec information to the terminating network, and the terminating network alters the resident codec decoding algorithm based on the originating network codec encoding algorithm; and FIG. 4 is a block diagram of a second method of the present invention whereby the originating network receives and determines the codec information of the terminating network, and the originating network alters the encoding algorithm based on the terminating network decoding algorithm.

DETAILED DESCRIPTION OF THE PREFERRED EMBODIMENT

FIG. 1 illustrates a block diagram of a communication network 10 according to the preferred embodiment of the present invention. Communication network 10 preferably comprises a wireless telephony network seen to include an originating terminal 12 coupled by an RF link to a servicing originating network 14. The originating terminal is preferably a wireless communication device such as a wireless mobile station, but may also be a fixed wireless station. The mobile station may operate based on any number of communication standards including AMPS, TDMA, D-AMPS, GSM, and IS-95 protocols. The originating network 14 typically includes a base transceiver station (BTS), a base switching center (BSC), and a main switching center (MSC), although the originating network can vary as different infrastructures are available from different manufacturers. Multiple BTSs, BSCs and MSCs are provided in a network, and FIG. 1 is simplified for purposes of illustration and clarity.

The originating network 14 is seen to be coupled to a transit network or communication link 16, which typically comprises a public switched telephone network (PSTN), but could also comprise an optical network if desired. The transit network 16 interfaces and communicates electrical signals including digitized voice calls between originating network 14 and a terminating network 18. Terminating network 18 may be the same as, or different than, the originating network 14, and may comprise of AMPS, D-AMPS, TDMA, GSM and IS-95 networks. Terminating network 18 is coupled to and services via an RF link a terminating terminal 20, which may comprise of a fixed or mobile station such as a wireless cellular or PCS subscriber. The wireless stations, BSCs and MSCs may have codecs as will be described shortly.

Referring to FIG. 2, there is shown an expanded block diagram of the communication network 10 shown in FIG. 1, wherein like numerals refer to like elements. The originating network 14 is seen to include a base transceiver station (BTS) 30 serving via a radio frequency (RF) link the originating mobile or fixed station 12. Each BTS 30 services multiple stations 12, although only one is shown for purposes of illustration and clarity. Originating network 14 is further seen to include a base switching center (BSC) 32 and a main switching center MSC 34. BSC 32 interfaces voice calls between multiple BTSs 30 and MSC 34, wherein BSC 32 typically serves multiple BTSs 30, although only one is shown for purposes of illustrating the present invention. Similarly, MSC 34 services multiple BSCs 32. MSC 34 is further seen to include a visitor location register (VLR) which includes and stores various information of the stations 12 currently being served by the originating network 14.

Terminating network 18 is seen to include a BTS 40 serving the terminating terminal 20, and typically serves multiple terminals 20. Terminating network 18 is further seen to include a BSC 42 and MSC 44. Terminating network 18 may operate according to the same operating protocol as originating network 14, i.e., both are GSM networks, or, the terminating network 18 may be different from the originating network 14, i.e., the originating network is GSM and the terminating network may be based on AMPS, D-AMPS, TDMA or IS-95 protocols. MSC 44 is also seen to include a VLR for maintaining a register of information for all stations 20 currently being served by the terminating network 18.

Transit network 16 is preferably a PSTN. Originating MSC 34 and terminating MSC 44 exchange digitized voice data thereover, which are preferably encoded in pulse code modulation (PCM) format, and transmitted at about 64 kbps. Although PCM is a preferred encoding format, other encoding formats are available according to the present invention. Likewise, other transfer speeds other than 64 kbps are also contemplated by the present invention. Generally, the digitized voice data transferred over transit network 16 can be in any format which is compatible and supported by both the originating network 14 and the terminating network 18.

Referring now back to the originating network 14, the originating network 14 is seen to include a compression and decompression device 46 commonly known as a codec. Codec 46 can reside at either the BSC 32 or at the MSC 34, depending on the type of network. For instance, in TDMA networks, the codec 46 is located at the BSC 32, but is typically located at the MSC 34 for other networks such as GSM networks. Codec 46 encodes the digitized voice signals into PCM format, typically operating at 64 kbps. A codec 48 at the terminating network 18 decodes the 64 kbps PCM encoded signals from transfer network 16 using a decoding algorithm. The decoded digital signals are then provided by codec 48 to BTS 40 for ultimate routing to the terminating terminal 20. Examples of encoding algorithms used by codecs 46 and 48 include RPE-LTP (Regular Pulse Excitation—Long Term Prediction) for a GSM Full-Rate Vocoder, and ACELP (Algebraic Code Excitation Linear Predictive). Typically, telephony communications across the PSTN 16 are duplex, and thus, encoding and decoding is performed by each codec 46 and 48 to facilitate duplex communications thereacross. Simplex communications are described hereafter for purposes of illustration and clarity, with it being understood the reverse link can operate the same as the forward link.

According to the first embodiment of the invention, the originating network 14 sends information indicative of the encoding algorithm of codec 46 to the terminating network 18. The terminating network 18, at either MSC 44 or BSC 42, depending where the codec 48 is located, receives the codec information indicating the encoding algorithm of codec 46 and then alters the decoding algorithm of codec 48 to better match the encoding algorithm. This improves speech quality since the terminating network 18 recreates the original encoded signal, instead of re-encoding the received signal. The terminating network 18, knowing the encoding algorithm utilized by the codec 46 at the originating network 14, then analyzes and examines the digitized speech signals, e.g. the 64 Kbps PCM data stream, to find sufficient encoding artifacts in the signal to recreate original encoding from the 64 kbps bit stream. The terminating network 18 examines actual speech samples and looks at the values present to determine both the parameters used for encoding and the values for the original encoded data itself. The terminating network 18 has signature waveforms for the originating network 14 encoding algorithm stored locally thereat for comparison. The terminating network 18 is equipped with a translation algorithm table. The origination codec information is used as a pointer or index to the table. The table contains coefficients and parameters to the general DSP encoding algorithm to optimize codec implementation on the terminating network 18 side of the call. In the case of the terminating network 18, which supports multiple termination terminal codecs, the table is expanded in an additional dimension so that the desired termination terminal 20 codec provides a secondary index or pointer in the table. The originating codec information can be transmitted in band, or out of band (OOB) across the PSTN 16.

In a further embodiment, the originating network 14 sends the originating codec 46 information and a start/sync flag to the terminating network 18 when the originating network 14 converts the digital signal to 64 kbps PCM. The start/sync flag indicates the start of an encoding period, e.g. 20 milliseconds for GSM networks. Terminating network 18 recreates the original encoding based on the originating codec information and the start/sync flag. The codec information and start/sync flag are transmitted in band or out of band. The availability of the start/sync flag at the terminating network 18 reduces the processor load such as DSP cycle at the terminating network 18.

Encoding algorithms currently used in telephony networks, both circuit and packet switched, are designed based on speech, converted to an analog signal, digitally sampled and then encoded. For terminating network/ terminating terminal combinations, which are based on receiving 64 kbps PCM, encoding in the termination network and decoding in the terminating terminal, specific algorithms based on knowledge of the original encoding at the originating network 14 improves quality. Examples include terminating calls from the PSTN 16 to GSM or Internet telephony subscribers.

According to a second embodiment of the present invention, codec information at the terminating network 18 is provided to the originating network 14. The original encoding algorithm at the originating network 14 is then altered from the standard to produce a "best fit" encoding matching the expected decoding algorithm at the terminating network 18.

In Internet telephony, the call setup negotiation phase includes codec negotiation. Even if the codecs do not match at the originating terminal and the termination terminal, the codec information is still available via standard means.

An IN solution is also possible, whether the SCP receives the codec information from the call on the originating network 14, or has stored a default originating network/ originating terminal codec and makes it available for query by the transfer network 16, the terminating network 18 and the termination terminal 20.

For some origination terminals and originating networks, the originating network type is sufficient to identify the encoding. For example, DECT networks have 32 kbps ADPCM encoding. Originating network information is made available explicitly in some existing network signaling protocols, and may be derived from the A-number in other cases.

For any case in which the transit network 16, and in cases of intelligent terminals at the originating network 14 and the terminating network 18, provides sufficient bandwidth, the origination network 14 and the terminating network 18 can use modems to setup a data connection through the transfer network 16 and pass both encoded speech and signaling through the data connection.

Referring to FIG. 2, one method of providing information of the codec encoding algorithms and codec decoding algorithms between the originating network and the terminating network is handled through the gateway main switching center (GMSC) 50 serving the originating network 14 and the terminating network 18. Upon initiation of a call by terminal 12, the MSC 34 generates an initial address message (IAM) and sends this IAM message to GMSC 50. The GMSC 50 in turn sends a SRI message to the home location register (HLR) 52 associated with the originating terminal 12. The HLR 52 in turn sends a RESP message to the terminating MSC 44. MSC 44 responds to the RESP message with a PRN message to HLR 52 identifying the codec decoding algorithm used at codec 48 of the terminating network 18 servicing the called terminating terminal 20. The HLR 52 in turn provides this codec decoding algorithm information to GMSC 50, which decoding algorithm information is provided back to MSC 34 in a ACM message. MSC 34 then modifies the encoding algorithm at codec 46 to better match the decoding algorithm that is used at the terminating network 18. This method improves voice quality by using an encoding algorithm at codec 46 that better matches the decoding algorithm at codec 48. The decoding algorithm at codec 48 then recreates the original encoding, rather than re-encoding the signal. This decoded signal is then provided to the termination terminal 20 to realize improved voice communications.

Other methods of identifying the decoding algorithm at codec 48 of the termination network 18 are also possible, such as backwards ISUP messages, such as PROGRESS.

The originating network 14 can also ascertain the decoding algorithm that is used at the termination network 18. Using either inband or out-of-band backwards signaling as discussed above, such as using the ISUP PROGRESS message, the terminating network 18 informs the originating network of the vocoder to be used. The start/sync flag is still passed in the forward direction as in the previous discussion, if it is used to indicate the start of an encoding period.

Referring to FIG. 3, a flow diagram of one method of the present invention is shown at 60. At step 62, the originating terminal 12 initiates a call through originating network 14. At step 64, the originating network 14 sends encoding algorithm information utilized at codec 46 to the terminating network 18. At step 66, the terminating network 18 receives the codec encoding algorithm information from the transit network 16, and determines which codec decoding algorithm is utilized at the originating network 14. At step 68, the terminating network 18 alters the decoding algorithm utilized at codec 48 as a function of the identified encoding algorithm to provide a best fit decoding matching the encoding at the originating codec 46 to improve the voice quality of the call. At step 70, the network 10 then completes the call between the originating terminal 12 and the terminating terminal 20.

Referring now to FIG. 4, there is shown a second method of the present invention at 72. At step 74, the originating terminal 12 initiates a call through the originating network 14. At step 76, the originating network 14 determines the decoding algorithm of codec 48 that is utilized at the terminating network 18 through network signaling. At step 78, the originating network 14 alters the encoding algorithm at codec 46 as a function of the identified decoding algorithm to match and better fit the decoding algorithm that is known to be used at the receiving codec 48. Thus, the original encoding algorithm utilized by codec 46 is altered from the standard to a "best fit" encoding matching the expected decoding at the terminating network 18. At step 80, the network 10 completes the call between the originating terminal 12 and the terminating terminal 20.

Though the invention has been described with respect to a specific preferred embodiment, many variations and modifications will become apparent to those skilled in the art upon reading the present application. For example, anywhere decisions are made upon a degraded measurement, the decision may be based upon a fixed threshold or a weighted analysis of recent readings. It is therefore the intention that the appended claims be interpreted as broadly as possible in view of the prior art to include all such variations and modifications.

We claim:

1. A communications system, comprising: an originating network, comprising:
   a transmitter for transmitting a first signal;
   an originating codec coupled to said transmitter for encoding said first signal according to an originating encoding algorithm; and
   a signal generator coupled to said transmitter for generating a second signal Identifying said originating encoding algorithm utilized by said originating codec;
   and a communications link for connecting said originating network to a terminating network, said terminating network comprising:
   a receiver for receiving said first signal;
   a terminating codes coupled to said receiver for decoding said first signal;
   a storage medium for storing waveforms representative of said originating codec waveforms for assisting in reconstruction of said encoded first signal; and
   a processor connected to said receiver for processing said second signal wherein said processor Is capable of analyzing encoding artifacts detected in said first signal and applying said analysis in conjunction with said originating encoding algorithm to reconstruct said first signal.

2. The communications system of claim 1 wherein said signal generator is capable of transmitting said second signal in the same band as said first signal.

3. The communications system of claim 1 wherein said signal generator is capable of transmitting said second signal across a public switched telephone network.

4. The communications system of claim 1 wherein said processor is capable of utilizing said originating encoding algorithm as a pointer to a translation algorithm table connected to said terminating network wherein said table contains coefficients and parameters related to said originating encoding algorithm.

5. The communications system of claim 1 wherein said processor is capable of utilizing said waveforms for altering a decoder algorithm.

6. A communications system for communicating an encoded first signal, comprising:
   a terminating network, comprising:
   a receiver;
   a storage medium for storing waveforms characteristic of an originating codec that encoded said first signal;
   a terminating codec coupled to said receiver for decoding said encoded first signal; and
   a processor connected to said receiver for receiving said first signal and a second signal for identifying the encoding algorithm of said first signal, wherein said processor is capable of analyzing encoding artifacts detected in said first signal and applying said analysis in conjunction with said encoding algorithm to reconstruct said encoded first signal.

7. The communications system of claim 6, further comprising:
   a translation algorithm table for storing coefficients and parameters useful for reconstructing said first signal; and
   a detector circuit for detecting said encoding artifacts in said first signal.

8. The communications system of claim 7, wherein said processor is capable of utilizing said originating encoding algorithm as a pointer to said translation algorithm table.

9. The communications system of claim 7 wherein said receiver Is capable of receiving said second signal via the same communications band as said first signal.

10. The communications system of claim 7 wherein said receiver is capable of receiving said second signal via the public switched telephone network.

11. A method of sending a first signal to a terminating network, comprising the steps of:

encoding said first signal utilizing an originating encoding algorithm;

transmitting said encoded first signal from an originating network to said terminating network;

sending a second signal Identifying said originating encoding algorithm to said terminating network;

storing waveforms characteristic of an originating codec that encoded said first signal;

detecting encoding artifacts in said encoded first signal; and reconstructing, in the terminating network, said encoded first signal utilizing said originating encoding algorithm, said stored waveforms and said encoding artifacts.

12. The method of claim 11 further including the step of transmitting said second signal in the same band as said encoded first signal.

13. The method of claim 11 further comprising the step of transmitting said originating encoding algorithm identifier across a public switched telephone network.

14. The method of claim 11 wherein said step of reconstructing said encoded first signal according to said originating encoding algorithm further comprises analyzing said encoded first signal utilizing said originating encoding algorithm.

15. The method of claim 11 further comprising the steps of:

analyzing said encoding artifacts detected in said encoded first signal; and applying said analysis of said encoding artifacts and said originating encoding algorithm to reconstruct said encoded first signal.

16. The method of claim 11 further comprising the step of utilizing said originating encoding algorithm as a pointer to a translation algorithm table.

17. A method of receiving an encoded first signal from an originating network, comprising the steps of:

receiving said encoded first signal;

receiving a second signal identifying an encoding algorithm of said encoded first signal;

detecting encoding artifacts in said encoded first signal;

utilizing said identifying second signal for pointing to a translation algorithm table;

accessing stored waveforms characteristic of an originating codec that encoded said first signal;

utilizing said waveforms, said encoding artifacts and said encoding algorithm to reconstruct said encoded first signal; and decoding said reconstructed encoded first signal utilizing a decoding algorithm corresponding to said encoding algorithm.

18. The method of claim 17 wherein said encoded first signal further includes a start-sync flag, wherein said start-sync flag is utilized by a terminating network to ascertain the start of an encoding period.

19. The method of claim 17 wherein said identifying second signal is transmitted in band with said encoded first signal.

20. The method of claim 17 wherein said identifying second signal is transmitted across a public switched telephone network.

* * * * *